2,864,746
PROCESS FOR CLEANING RAW WOOL

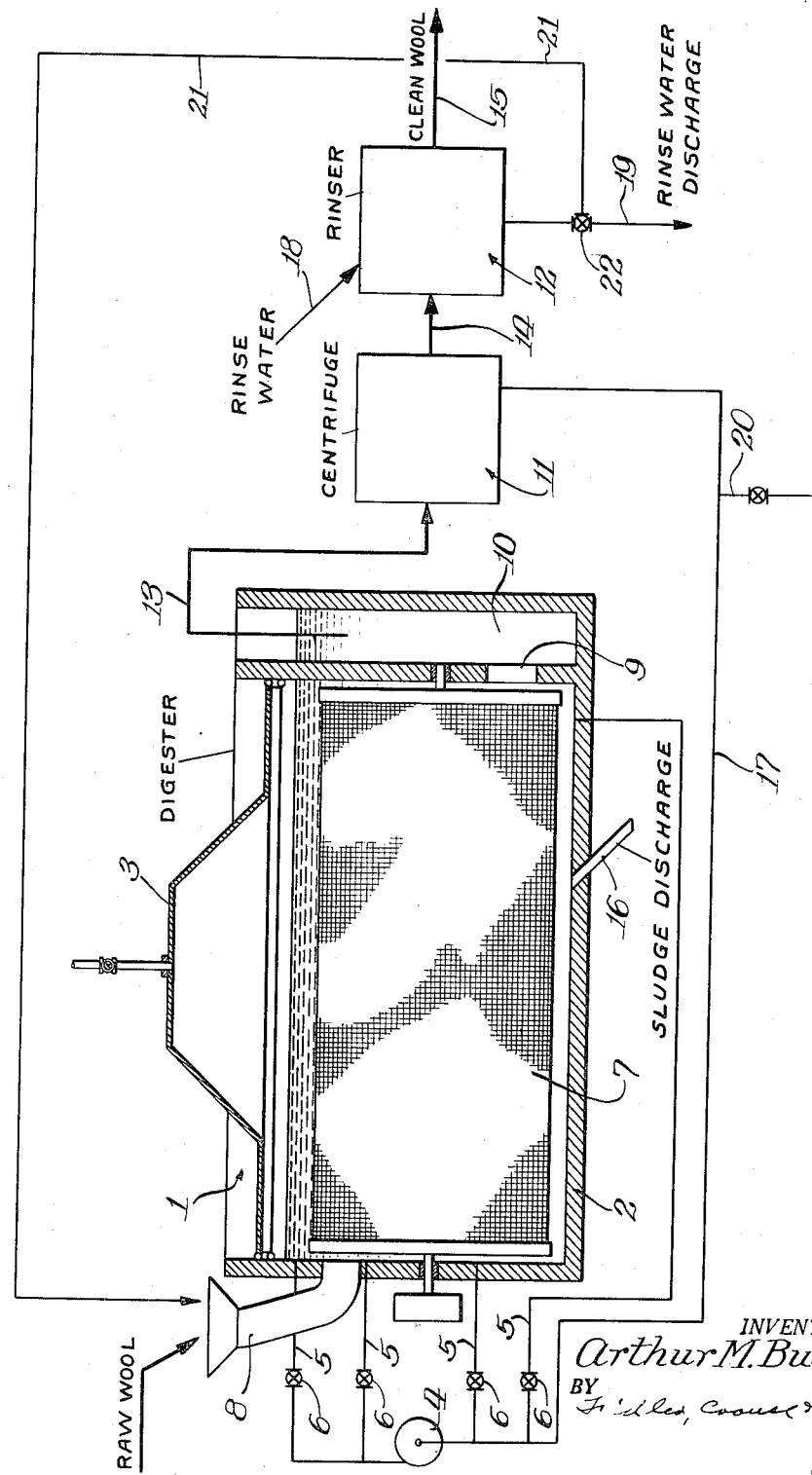

Arthur M. Buswell, Gainesville, Fla.

Application June 6, 1956, Serial No. 589,650

12 Claims. (Cl. 195—6)

This invention relates to a process for cleaning raw wool. More particularly, the invention relates to a process for removing foreign materials from raw wool by subjecting the raw wool to anaerobic fermentation.

Raw wool, that is, wool after shearing and before any treatment, consists of only about 50% wool fiber. The non-fiber portion consists of natural fats and waxes, dirt, dried perspiration, excreta, vegetable debris and other foreign matter. Before the wool can be spun into yarn or thread it is necessary to remove the foreign material. This cleaning process, which is the first step in wool manufacture, is commonly referred to as "scouring." The usual "scouring" process consists in washing the wool in a water solution of soap and alkali in a series of vessels commonly referred to as "bowls." The cost of soap and alkali used for this washing is a substantial item of expense as the materials thus required amount to 10% or more of the weight of the wool. Moreover, the wash water, after cleaning the wool, has a high organic content which, when measured by the BOD (biochemical oxygen demand) test, may run as high as 20,000 p. p. m. (parts per million). If this wash water is discharged into a stream as a waste liquor it will impose a heavy pollution load on the natural purification capacity of such stream. While such heavy waste can be purified by either aerobic or anaerobic processes used in conventional sewage waste purification plants, the high concentration of this waste makes it necessary to provide relatively large treatment works, the cost of which in many instances would be prohibitive.

The dried perspiration contains a considerable amount of potassium salts of fatty acids, sometimes 15% grease and 4% potash ($K_2O$). While several methods have been devised for recovery of the valuable grease and potash from the scouring liquors resulting from conventional scouring processes, they have found limited application up to the present time. Two "dry" degreasing processes which do not produce liquid waste have been proposed. One such process involves extraction of the grease by a non-aqueous solvent. The other process, known as the "frosting" process, consists in passing the raw wool through a cold chamber (well below 0° F.), thus rendering the grease hard and brittle. The wool is then freed of the grease by pounding or beating and subsequent dusting. These "dry" degreasing processes have found very limited application and the problem of degreasing wool economically without producing a serious waste disposal problem has remained unsolved up to the present time.

In addition to the foreign materials of animal origin such as fats and waxes, dried perspiration and the like, raw wool contains debris of vegetable origin such as burrs, straw and the like. Such vegetable debris is very incompletely removed or altered by the usual scouring process and must, therefore, be removed later by a treatment of the yarn or cloth known as "carbonizing." This consists of a sulphuric acid treatment followed by heat to render the vegetable matter brittle so that it can be removed by "willowing" or beating, followed by neutralization of the acid by washing.

It has been known that "grease" as ordinarily found in sewage sludge and composed mainly of soaps and "fats" (known chemically as glycerides of fatty acids) could be decomposed and removed as methane and carbon dioxide by subjecting them to anaerobic fermentation. It was also known that "wool grease," when removed from raw wool with soap and alkalies in hot water, could be decomposed by anaerobic fermentation in an emulsified and altered state in which such grease is found in "scour liquor."

Wool grease consists essentially of two fractions: the fat which is insoluble in water but soluble in organic solvents, and the suint which is soluble in water and alcohol but has limited solubility in other organic solvents. The relative amounts of these constituents vary but they appear to be about equal. The "fat" consists largely of a substance known as lanolin. Lanolin is not a fat in the chemical sense of the term but is classified as a wax. Fats, strictly speaking, are glycerides; that is composed of glycerine combined with natural fatty acids, e. g., butyric, stearic, etc. Waxes are esters of higher alcohols with higher organic acids. The alcohol in lanolin is cholesterol (with isocholesterol) whose complex structure includes five and six membered rings. Its empirical formula is $C_{27}H_{45}OH$. The acid portion of the lanolin ester has 26 carbon atoms not in a straight chain as in normal aliphatic acids but branched as in the iso acids. The water soluble fraction "suint" consists mainly of potassium soaps, i. e., potassium salts of acids found in animal fat and analyzes about 25% $K_2O$. As mentioned above, the cholesterol constituent of lanolin has a complicated structure of interlocking rings which are known to be resistant to anaerobic atack, and, since it is also insoluble in water, successful application of anaerobic treatment is not indicated. Thus, it could not be predicted that such wax in its natural state and unaltered by chemical treatment with soap and alkali would be subject to anaerobic fermentation.

In the processing of certain vegetable fibers such as flux, hemp, and jute, it is customary to subject the stalk or straw to anaerobic fermentation treatment for the purpose of removing undesirable constituents, mainly sugars and gums, and to soften the fibers. This process, applied to vegetable fiber, is known as "retting." The material removed by retting vegetable tissue is largely composed of carbohydrates which are chemically distinct from wax found on wool fibers, and hence there was no basis for assuming that a process similar to retting would be successful in removing wool grease from raw wool.

Likewise in the tanning of hides it is customary to subject the hides to an anaerobic treatment, one form of which is called "puering." The hides are placed in water in large vats. An inoculum of dog dung, various bacteria, or, in more modern practice, concentrated purified enzyme is added. The purpose of this process is to partially digest or dissolve the fleshings on the inside of the hide and the substances around the hairs. This action loosens the fleshings and hair so that they are readily removed by scraping with a blunt blade. The substances attacked in this process are protein in nature and the enzymes produced by the bacteria or added in pure form are proteolytic or protein splitting enzymes. Proteins are distinct from the carbohydrates attacked in the retting process or the wax attacked in the treatment of wool grease, and there is no basis for assuming the puering would dissolve wool grease; in fact, it would not. Nor would either retting or puering convert the wax and grease to methane and carbon dioxide as is done by anaerobic fermentation.

An object of the present invention is the provision of a novel process for removing foreign materials from raw wool.

Another object is the provision of a process for removing foreign materials from raw wool without the use of injurious chemicals and with a minimum of physical manipulation of the wool.

Another object is the provision of a process for cleaning raw wool which does not require the use of chemicals such as soaps and alkalies and which can be practiced relatively inexpensively.

A further object of the invention is to provide a process for removing foreign materials from raw wool, in which process the resulting waste materials are such that they can be readily disposed of economically and which process therefore does not entail any substantial expense in connection with the disposal of the resulting waste materials.

Still another object of the invention is provision of a process for removing foreign materials from raw wool whereby substantial proportions of the vegetable components of the foreign materials are removed and the remainder rendered soft and more friable with a resulting substantial reduction in the extent of carbonizing treatment required.

Still a further object of the invention is provision of a process for cleaning raw wool which not only is relatively inexpensive to practice but which also lends itself to the recovery of valuable components of the foreign material removed from the raw wool.

Still another object is the provision of an effective and inexpensive process for cleaning wool which may be operated continuously and which lends itself to the utilization of automatic apparatus for carrying out the process.

Still a further object is the provision of a process wherein the organic components of the foreign materials in the raw wool are decomposed, at least in part, in situ, thereby freeing the inorganic components which then fall out of the wool or can be readily removed.

Other objects and advantages of the invention will appear from the following description taken in connection with the appended drawing in which:

The single figure is a schematic illustration of a preferred form of system suitable for carrying out the process in accordance with the present invention.

I have discovered that wool grease or wax (including lanolin and other components) in its natural state and without any preliminary treatment, can be converted to methane and carbon dioxide by anaerobic fermentation or "digestion." I have further discovered that such anaerobic fermentation or digestion may be effectively carried out on the raw wool grease in situ on the wool fibers. Furthermore, I have discovered that anaerobic fermentation of the organic components of the foreign materials adhering to raw wool fibers may be carried out without injuring the wool fibers in any way.

In the preferred form of my invention I initiate the process by introducing into a fermentation tank, or "digester," liquor from an active sewage sludge digester, which liquor contains active methane-producing organisms.

Raw wool which has been removed from the animal or hide as by shearing and without any prior cleaning treament is introduced in small amount, preferably about 0.05 pound per cubic foot of digester volume, into the digester. As soon as digestion of the organic components of the foreign material adhering to the wool fibers commences, more wool is added from time to time until the capacity of the digester is reached. The amount of wool added at any time and the time period of such additions is not critical, except that care should be taken not to overload the digester to such an extent that the volatile acids concentration becomes excessive, as explained more in detail hereinafter.

The optimum rate of feed or "capacity" of the digester will depend upon various factors such as the temperature at which the contents are maintained, and the amount of digestible foreign materials on the wool fibers. However, I have found that under usual conditions the optimum capacity, when the digester is operating at full load, is approximately one-half pound of wool (dry weight basis) per cubic foot of digester volume per day.

It should be explained at this point that the expression "digester volume" means the volume of the contents of the digester including the liquor and the wool. Preferably the digester is substantially filled by the contents, in order to obtain maximum utilization of the digester.

The digester contents are maintained at a suitable temperature for supporting the digestion action of the micro-organisms and preferably at the optimum temperature for such digestion action. I have found that the optimum temperature of digestion under ordinary circumstances is approximately 95° F. and I prefer to maintain this temperature. I have found that best results are obtained where the temperature is constant and uniform throughout the contents. To this end, the contents are heated, where necessary, in order to maintain the desired temperature, in a manner similar to that employed in the sludge digestion field, as hereinafter described more in detail. Moreover, the liquor is circulated in a suitable manner in order to prevent either thermal or chemical stratification, or segregation of the liquor and raw wool.

The digester contents are maintained under anaerobic conditions in order that the anaerobic fermentation may proceed under conditions such, for example, as those existing in a sewage sludge digester. To this end the digestion is carried out in a closed fermentation tank or digester of a type generally similar to that used for digesting sewage sludge, the preferred form of tank or digester being more particularly described hereinafter.

The liquor and raw wool in the digester are gently agitated in order to allow escape of the gas which is evolved by the digestion process, which gas preferably is collected and utilized either for heating the contents of the digester or for other purposes.

The fermentation is maintained by means of ammonia nitrogen control and volatile acids control, which latter is effected by recirculation of the fermentation liquor and regulation of the load in a manner similar to that employed in maintaining the fermentation in a sewage sludge digester.

More particularly, the volatile acid control is applied in accordance with the principles disclosed in Buswell and Boruff Patent No. 2,029,702, dated February 4, 1936. Briefly, the volatile acid control consists in making a determination of the volatile acid concentration (that is, volatile acids and their salts calculated as acetic in accordance with the procedure described on page 30 of Bulletin 29 of the Illinois State Water Survey, published May 30, 1930) in the digester liquor at periodic intervals, preferably daily. If the volatile acid determination indicates a concentration of more than 2,000 p. p. m., then either of the following steps are taken:

(a) The loading of the digester, that is the rate of introduction of raw wool into the digester, is reduced; or (b) Lower volatile acid content material is circulated to the digester from a suitable source, which in the preferred embodiment of my invention is the liquor separated from the wool after the latter has been removed from the digester, as hereinafter described.

Ammonia nitrogen control is effected in accordance with the principles disclosed in Buswell and Boruff Patent No. 1,990,523, dated February 12, 1935. Briefly, this consists in maintaining a concentration of approximately 30 p. p. m. to approximately 600 p. p. m. of ammonia nitrogen by adding to the contents of the digester a suitable quantity of an ammonia nitrogen-containing compound. While any source of ammonium nitrogen may be used I prefer to use the least expensive one. Accordingly, I preferably use ammonium sulphate although other sources of ammonia nitrogen may be employed, such as anhydrous ammonia, or a soluble ammonium salt such as ammonium nitrate or ammonium phosphate.

However, in most cases it is not necessary to add any ammonia-nitrogen-containing material inasmuch as the foreign materials adhering to raw wool include nitrogenous components such as dried urine, feces, and dried perspiration which usually are in sufficient proportions to provide the desired concentration of ammonia nitrogen.

During the digestion, the grease forming the principal component of the foreign material adhering to the wool fibers is converted to methane and carbon dioxide, the vegetable impurities (burrs, straw and the like) are softened and disintegrated and the inorganic components (such as dirt) fall from the fibers. The insoluble organic solids of the foreign material, such as dirt, grit and the like, and any other heavy solids, are liberated and fall to the bottom of the tank and are removed from the bottom of the tank periodically as desired. The soluble components of the foreign material (such as suint and dried urine) pass into solution and are washed off the fibers by the liquor in the digester.

As explained elsewhere herein, the process while preferably carried out as a continuous one, nevertheless alternatively may be carried out as a batch process. In either case, the time necessary to effect the digestion of the foreign materials on a particular specimen of wool to any particular extent depends upon a number of factors such as the relative amount of foreign materials on the wool fibers, the strength of the inoculum, the temperature at which the contents of the digester are maintained, the ammonia nitrogen concentration, the volatile acids concentration, and the loading rate. Under optimum conditions such as described in connection with the preferred embodiment of my invention approximately 70% of the wool grease is removed in the 24 hour period following the establishment of the digestion of such grease. Approximately 70% of the remaining wool grease is digested during the next 24 hour period and so on. Thus it will be seen that during the first 24 hour period after digestion has been established approximately 70% of the wool is removed, during the next 24 hour period a further 21% is removed, and during the third 24 hour period a further 6.3% of the wool grease is removed, leaving approximately 3% of the wool grease remaining after a 72 hour period of digestion.

Preferably the digestion is carried out for a sufficient period to effect removal of approximately 85% of the grease from hte fibers. Under optimum conditions this will require that the digestion be carried on for approximately 42 hours.

When the digestion has been carried out to the desired extent the wool is removed from the digester, and suitably dewatered. The dewatered wool is then rinsed to remove residual digester liquor and loosened foreign material and suitably dried, after which it is ready for the manufacturing process.

In some cases it may be found desirable to subject the wool cleaned by the just-described process to a light scouring by conventional methods, but in other cases such scouring is not necessary.

The liquor which is removed from the wool fibers in the dewatering step contains active organisms and therefore preferably is returned to the digester to seed the digester liquor.

Since the liquor in the digester and the liquor removed from the wool fibers contains valuable by-products such as potash it preferably is not disposed of until the potash has been recovered. In the operation of this process, the potash is gradually concentrated in the liquor and is removed when the potash concentration (soluble inorganic) becomes sufficient to warrant the recovery.

In the process of removing impurities from raw wool in accordance with the present invention water is used up by the chemical reactions occurring in the digestion, hence it is necessary to add water to the digester in order to maintain the liquid level required for operation. Therefore, there will ordinarily be no overflow liquor to dispose of. In the digestion of sewage sludge for example, the material added to the digester characteristically contains 95% or more of water and after the fermentation is complete this water, decreased in amount by only a few per cent and saturated with foul fermentation products, remains to be disposed of. In my process dry wool is added to the digester which is filled to a desired level with water, and as stated above, a substantial part of this water is consumed in the digestion reactions. The amount of water thus consumed may be equal to 10% to 30% of the weight of the wool. The rinse water ordinarily will be supplied in sufficient quantity to supply the requirements for added or make-up water. Accordingly, I return discharged rinse water to the digester in sufficient quantity to meet the water requirements of the process. A substantial portion, if not all, of the rinse water will ordinarily be required for his make-up. Thus little or no liquid waste will be produced. A small amount of sludge consisting of earthy materials and lignin like substances will accumulate in the digester, but as an easily disposable sludge.

The effectiveness of the process in accordance with my invention can best be shown by the following specific examples:

*Example I*

Unprocessed, raw wool in the amount of 50 parts by weight was placed in a container containing 1750 parts by volume (approximately 1750 parts by weight) of overflow liquor from a sewage disposal plant and containing active methane-producing organisms. The container was closed, except for a gas-collecting column from which gas collection could be measured. The contents of the container were allowed to incubate at 37° C. and were gently agitated daily to assist the escape of gas and to improve the fermentation rate.

Fermentation was allowed to proceed until digestion of the wool grease was 68% complete, at the end of which time the total gas production amounted to 142 parts by volume.

The wool was then removed from the container, rinsed in water and dried.

*Example II*

Unprocessed, raw wool in the amount of 100 parts by weight was placed in a container containing 1750 parts by volume (approximately 1750 parts by weight) of overflow liquor from a sewage disposal plant and containing active, methane-producing organisms. The container was closed, except for a gas-collecting column from which gas collection could be measured. The contents of the container were allowed to incubate at 37° C. and were gently agitated daily to assist the escape of gas and to improve the fermentation rate.

Fermentation was allowed to proceed until digestion of the wool grease was 68% complete at the end of which time the total gas production amounted to 327 parts by volume.

The wool was then removed from the container, rinsed in water and dried.

In both of the foregoing examples the wool removed from the fermentation container showed no evidence of disintegration of the fibers when examined under the microscope and it also showed a complete absence of particles of vegetable matter, although the wool before fermentation showed a considerable number of particles of such material.

As shown by the foregoing examples, the amount of wool grease which can be removed during any predetermined period of time by anaerobic fermentation is roughly proportional to the amount of material fed to a digester of given capacity up to the physical limit imposed by the volume of the digester. This result is in accordance with results obtained in other applications of the anaerobic digestion process (Illinois State Water Survey Bulletin 32, chapter IV).

On the basis of the foregoing examples, it was determined, that after full digestion of the wool grease is established, approximately 70% of the wool grease remaining is digested during any 24 hour period.

Instead of employing digester liquor to initiate the process, I may use water seeded with active methane-producing organisms, either before or after it is put in the tank. Partially digested sewage sludge provides an excellent seeding material. Another seeding material suitable for use in my process is a prepared bacterial culture which is prepared by inoculating with active methane-producing organisms a culture medium consisting of asbestos washed with a known bacterial nutrient, such as sodium acetate. After vigorous growth of the micro-organisms is obtained the liquor is separated from the asbestos and is employed as in inoculum.

The micro-organisms employed in accordance with my invention in digesting the organic components of the foreign material present in raw wool are those known as "methane-producing organisms" or "methane-producing bacteria." Such organisms are found in sewage sludge digester liquor, overflow liquor from a sewage disposal plant, partially digested sludge from the bottom of a sewage sludge digester, partially dried sewage sludge, river muds, swamp bottoms, manure piles, compost piles and other places where decomposing organic material is held in the absence of oxygen.

In the sludge used as the inoculum for the wool-grease fermentation in accordance with my invention, two micro-organisms have been observed as the predominant types present:

(1) A gram negative non-spore forming bacterium 2–4 microns in length and 0.4–0.6 micron in width which appear singly, in pairs and in chains. Morphologically this organism appears to be *Methanobacterium söhngenii* but did not show the bundles reported by Söhngen. This bacterium is, therefore, referred to as *Methanobacterium söhngenii*, $V_1$.

(2) A small micrococcus approximately 0.1–0.3 micron in diameter which appears singly and in small groups. This coccus is non-spore forming and variable in the gram stain conforming to *Methanococcus mazei*. The biochemical reactions are also consistent with the description of *Methanococcus mazei* and the organism is so identified.

While these two methane-producing organisms have been definitely identified in cultures producing the anaerobic fermentation of wool grease in accordance with my invention, I do not limit my process to them. In my experience, any one or more of the following organisms currently recognized as methane-producing organisms would be capable of producing a similar result:

*Methanobacterium omelianskii*
    *Sarcina methanica*
    *Methanococcus vannielii*
    *Methanosarcina methanica*
    *Methanosarcina barkerii*

After the process has been initiated, no further seeding ordinarily will be required, but as will be understood by those acquainted with sewage sludge digestion, it may be necessary to provide additional seeding from time to time, where the bacteria has become less active due to unusual conditions such as extreme cold or the like, or where the system has been shut down for any reason. Ordinarily, therefore, the only material which need be supplied to the digester in addition to the raw wool to be seeded is water. While I prefer to employ the rinse water to supply the requirements for added or make-up water, on the other hand, water may be supplied to the process in any suitable manner, as for example, it may be introduced into the digester along with the raw wool.

I have found that it is desirable to maintain the percentage of water to the total digester contents at not substantially less than 85% by weight of water. The only upper limit to the percentage of water is that dictated by economic considerations. It will be obvious that the higher percentage of wool in the digester up to the maximum desirable percentage of approximately 15% by weight will result in a greater capacity for treatment of the wool for any given size of apparatus and therefore, it is preferable that the percentage of water be maintained at approximately 85% by weight.

While as above stated, the optimum temperature for digestion of the wool grease is approximately 95° F., nevertheless the process may be carried out at any temperature within the range from 32° F. to approximately 155° F. As noted above, however, it is important that the temperature remain substantially constant if the process is to proceed under the optimum conditions. It is well known that methane-producing organisms are sensitive to changes in temperature and the digestion process is slowed down upon any sudden change in temperature of the digesting material.

It has been found that it is unnecessary to take any measures designed to control the pH of the digester liquor. In fact, in some cases the addition of lime stimulates the production of acid. The pH of the digester contents does not indicate the progress of the digestion. The volatile acids determination gives a value which includes both free acid and a salt and is independent of the pH value.

While, as above indicated I prefer to carry out the digestion for a period sufficient to remove approximately 85% of the wool grease, ordinarily the extent to which this process is carried out will be determined primarily by economic considerations. The percentage of wool grease present on any specimen of wool is determined by accepted chemical analysis of a wool sample as for example, extraction with a suitable solvent such as carbon tetrachloride. Ordinarily it will be found more economical to remove the wool after digestion of more than 85% of the wool grease and to subject the wool to a subsequent light scouring process for removal of a substantial proportion or all of the remaining wool grease. However, the digestion may be carried out for a longer period and may in some cases be carried out until substantially all of the wool grease is digested. It is desirable of course to stop the digestion before the keratin-dissolving enzymes weaken or disintegrate the wool fibers. The weakening or initiation of the disintegration of the fibers is determined readily by a microscopic examination of the fibers.

While it is not necessary to the success of the process, nevertheless, a wetting agent or emulsifying agent may be added to the raw wool or to the contents of the digester in order to aid in a dispersion of the grease and rendered more easily attacked by the bacteria and/or their enzymes.

As shown schematically in the appended drawing, a preferred form of system suitable for carrying out the process in accordance with the present invention includes a fermentation vessel or digester 1, of the general type used for digesting sewage sludge. The digester includes a tank 2 provided with a floating cover 3 to facilitate addition and withdrawal of liquids or solids without the introduction of air, which might form an explosive mixture with the methane produced in the process. The digester is provided with a plurality of circulating pumps 4 connected to the digester tank by a plurality of connections 5 to provide adequate flexibility in circulating the liquor in the tank 2. Valves 6 are provided for controlling the flow in connections 5. Suitable heating means (not shown) are provided for maintaining the digester contents at the desired temperature. Such heating means (not shown) preferably comprises an external heating system such as disclosed and claimed in U. S. Patent No. 2,516,076 granted July 18, 1950, to Harry E. Schlenz, although internal heating coils such as are commonly employed in connection with sewage sludge digesters may be employed in lieu thereof.

The digester is provided with suitable means for propelling the wool through the tank during the fermentation process at a rate to allow the desired degree of degreasing to take place and at the same time to gently agitate the digesting material, allowing the prompt escape of gas which is favorable to the process. Such means also is so constructed as to confine the wool so as to maintain it submerged in the liquor, preventing the formation of a mat-like mass at the surface of the digester liquor. A preferred means suitable for carrying out these functions takes the form of a revolvable drum 7 mounted for revolution about a horizontal axis and having both ends open in order to permit the introduction into and removal of wool from the drum. The drum is of reticulate construction in order to permit circulation of the digester liquor into the drum and the mass of wool contained therein. Suitable means (not shown) are provided for rotating the drum.

The tank is provided with a suitable inlet 8 through which the raw wool is introduced into the tank and positioned to guide the wool into the intake end of the drum. Adjacent the outlet end of the drum is an outlet opening 9 through which wool is removed from the digester tank 2. A suitable sump or well 10 is provided for receiving the wool from the digester tank.

A suitable dewatering means is provided which is located adjacent the digester end, which preferably takes the form of a centrifuge 11 although other suitable means for removing liquor from the wool may be employed.

In addition, suitable rinsing means such as a rinser 12 is provided for thoroughly rinsing the wool after it has been dewatered in order to remove the residue of digester liquid and any other material adhering to the wool fibers. The rinser is provided with a connection 18 for supplying rinse water thereto and a waste discharge 19 for discharging waste water, if such is found necessary.

The process lends itself excellently to complete or partial mechanization and in the preferred form of the invention I provide mechanical conveyor means whereby the wool is handled completely by mechanical means from the time of introduction into the digester until removal from the rinser. To this end suitable conveyor means, indicated diagrammatically at 13, are provided for removing the wool from the well 10 and conveying it to the centrifuge 11. Similarly a suitable conveyor, indicated diagrammatically at 14 is provided for conveying the wool from the centrifuge 11 to the rinser 12 and in certain instances, a discharge conveyor, indicated diagrammatically at 15 is provided for removing the clean wool from the rinser 12 and conveying it to a point of further processing. Of course, the process may be carried out by introducing the raw wool into the digester manually and removing it manually and passing it to the centrifuge and rinser manually.

The insoluble inorganic components of the foreign material adhering to the wool and other solids which drop to the bottom of tank 2 are removed periodically from the bottom of the tank and to this end a suitable sludge discharge pipe is provided. Collecting means (not shown) of a known type are provided for directing the material into the sludge discharge pipe 16.

The liquor which is removed from the wool fibers by the centrifuge 11 is returned to the digester from the centrifuge 11 to seed the liquor. To this end a return connection 17 leading from the centrifuge 11 to the inlet side of the circulation pump 4 is provided. A suitably located draw-off conduit 20, which preferably is connected to the connection 17 is provided for withdrawing liquor from the system.

I provide a connection 21 from the rinse water discharge pipe 19 and the inlet to the digester 1 to carry all or a desired portion of the waste water back to the digester. Suitable valve means 22 are provided for controlling the flow in pipes 19 and 21. If for any reason a rinser is not used or the waste is insufficient, make-up water is added to the system from a suitable source (not shown).

The process of the present invention provides for the effective and economical cleaning of raw wool to remove foreign material therefrom. The process does not require any chemicals such as soaps and alkalies but requires only initial seeding material and thereafter only water. Moreover, methane gas is produced which can be utilized in maintaining the contents of the digester at the desired temperature or for other heating purposes. In addition, valuable potash is recovered from the fermentation liquor.

The non-fibrous foreign materials are converted mainly to gases and hence eliminate the liquid waste problem heretofore present where wool has been washed by conventional scouring methods. The liquor which must be disposed of in connection with the present process, consisting of diluted rinse water is such that it may be disposed of in a manner similar to that employed in connection with sewage sludge digestion and presents no serious problem.

The vegetable impurities are decomposed to a considerable extent and the residue is rendered soft and friable, thus adding to the savings accomplished by the use of the present process. The inorganic solids are precipitated in the course of fermentation and thus no special operation is required for that purpose.

The process in accordance with the present invention converts all of the cellulose, vegetable sugars and other constituents of the vegetable matter to carbon dioxide and methane, only the dense lignin portions of the plant tissue remaining. Thus approximately 60% or more of the vegetable matter is converted to gas. Consequently, the wool, after fabrication into yarn or cloth, requires a much reduced carbonizing treatment.

The process of the present invention lends itself readily to mechanization and may be carried out in an automatic or semi-automatic system, thus greatly increasing the economies possible by use of this process. Depending upon the application of the process, it may be carried out either as a batch or as a continuous process.

This is a continuation-in-part of my application Serial No. 497,960 filed March 30, 1955, which was a continuation-in-part of my application Serial No. 266,715, filed January 16, 1952, now abandoned.

I claim:

1. The process of removing from raw, shorn wool naturally adherent wool grease consisting essentially of lanolin and suint, which comprises introducing said raw wool with said wool grease adhering thereto into an aqueous liquor containing one or more types of active, methane-producing organisms from the group consisting of *Methanobacterium söhngenii*, $V_1$, and *Methanococcus mazei*, excluding air from said liquor, maintaining said liquor and wool at a temperature of between approximately 32° F. and approximately 155° F., a volatile acids concentration of not substantially more than 2000 p. p. m., an ammonia nitrogen concentration of between approximately 30 and approximately 600 p. p. m., and a water to wool ratio not substantially less than 85 parts by weight of water to 15 parts by weight of wool, retaining said wool in said liquor for between approximately 24 hours and approximately 72 hours to effect digestion of the wool grease, then separating the wool fibers from said liquor.

2. The process of removing from raw, shorn wool naturally adherent wool grease consisting essentially of lanolin and suint, which comprises introducing said raw wool with the wool grease adhering thereto into an aqueous liquor containing one or more types of active, methane-producing organisms from the group consisting of *Methanobacterium söhngenii*, $V_1$, and *Methanococcus mazei*, excluding air from said liquor, maintaining said liquor and wool at a temperature of between approximately 32° F. and approximately 155° F., a volatile acids concentration of not substantially more than 2000 p. p. m., an ammonia nitrogen concentration of between approximately 30 and approximately 600 p. p. m., and a water to wool ratio of not substantially less than 85 parts by weight of water to 15 parts by weight of wool, retaining said wool in said liquor for between approximately 24 hours and approximately 72 hours to effect digestion of the wool grease, the separating of the wool fibers from said liquor, rinsing said separated fibers, and drying said rinsed fibers.

3. The process of removing from raw, shorn wool naturally adherent wool grease consisting essentially of lanolin and suint which comprises introducing said raw wool with the wool grease adhering thereto into an aqueous liquor containing one or more types of active, methane-producing organisms from the group consisting of *Methanobacterium söhngenii*, $V_1$, and *Methanococcus mazei*, excluding air from said liquor, maintaining said liquor and wool at a temperature of approximately 95° F., a volatile acids concentration of not substantially more than 2000 p. p. m., and an ammonia nitrogen concentration of approximately 600 p. p. m., and a water to wool ratio proportion of approximately 85 parts by weight of water to 15 parts by weight of wool, retaining said wool in said liquor for approximately 42 hours to effect digestion of the wool grease, and then separating the wool fibers from said liquor.

4. The process of removing from raw, shorn wool naturally adherent wool grease consisting essentially of lanolin and suint, which comprises passing said raw wool with the wool grease adhering thereto into an anaerobic digestion zone containing an aqueous liquor having therein one or more types of active methane-producing organisms from the group consisting of *Methanobacterium söhngenii*, $V_1$, and *Methanococcus mazei*, maintaining the contents of said zone at a temperature of between approximately 32° F. and approximately 155° F., a volatile acids concentration of not substantially more than 2000 p. p. m., an ammonia nitrogen concentration of between approximately 30 and approximately 600 p. p. m., and a water to wool ratio of not substantially less than 85 parts by weight of water to 15 parts by weight of wool, retaining said wool in said zone for between approximately 24 hours and approximately 72 hours to effect digestion of the wool grease, then removing the wool fibers from said digestion zone, separating said fibers from liquor adhering thereto and returning at least a portion of such separated liquor to said digestion zone to aid in maintaining said volatile acids concentration and water to wool ratio.

5. The process of removing from raw, shorn wool naturally adherent wool grease consisting essentially of lanolin and suint which comprises passing said raw wool with the wool grease adhering thereto into an anaerobic digestion zone containing an aqueous liquor having therein one or more types of active, methane-producing organisms from the group *Methanobacterium söhngenii*, $V_1$, and *Methanococcus mazei* maintaining the contents of said zone at a temperature of between approximately 32° F. and approximately 155° F., a volatile acids concentration of not substantially more than 2000 p. p. m., an ammonia nitrogen concentration of between approximately 30 and approximately 600 p. p. m., and a water to wool ratio of not substantially less than 85 parts by weight of water to 15 parts by weight of wool, retaining said wool in said zone for between approximately 24 hours and approximately 72 hours to effect digestion of the wool grease, then removing the wool fibers from said zone, rinsing said separated fibers, and returning at least a portion of the waste liquid from said rinsing step to supply at least a portion of the water to maintain said water to wool ratio.

6. The process of removing from raw, shorn wool naturally adherent foreign materials including wool grease consisting essentially of lanolin and suint, dried excreta, cellulosic materials and inorganic materials, which comprises introducing said raw wool with said materials adhering thereto into an aqueous liquor containing one or more types of active, methane-producing organisms from the group consisting of *Methanobacterium söhngenii*, $V_1$, and *Methanococcus mazei*, excluding air from said liquor, maintaining said liquor and wool at a temperature of between approximately 32° F. and approximately 155° F., a volatile acids concentration of not susbtantially more than 2000 p. p. m., and ammonia nitrogen concentration of between approximately 30 and approximately 600 p. p. m., and a water to wool ratio of not substantially less than 85 parts by weight of water to 15 parts by weight of wool, retaining said wool in said liquor for between approximately 24 hours and approximately 72 hours to effect digestion of the organic components of said foreign materials and to loosen the inorganic components, and the separating of the wool fibers from said liquor, rinsing said separated fibers to remove liquor and loosened foreign materials therefrom, and drying said rinsed fibers.

7. The process of removing from raw shorn wool naturally adherent wool grease, consisting essentially of lanolin and suint, which comprises introducing said raw wool with said wool grease adhering thereto into sewage sludge digester liquor containing anaerobically digesting organic material, excluding air from said liquor, maintaining said liquor and wool at a temperature of between approximately 32° F. and approximately 155° F., a volatile acids concentration of not substantially more than 2000 p. p. m., an ammonia nitrogen concentration of between approximately 30 and approximately 600 p. p. m., and a water to wool ratio not substantially less than 85 parts by weight of water to 15 parts by weight of wool, retaining said wool in said liquor for between approximately 24 hours and approximately 72 hours to effect digestion of the wool grease, and then separating the wool fibers from said liquor.

8. The process of removing from raw, shorn wool naturally adherent wool grease, consisting essentially of lanolin and suint, which comprises introducing said raw wool with said wool grease adhering thereto into an aqueous liquor seeded with material from a sewage sludge digester containing active, methane-producing organisms, excluding air from said liquor, maintaining said liquor and wool at a temperature of between approximately 32° F. and approximately 155° F., a volatile acids concentration of not substantially more than 2000 p. p. m., an ammonia nitrogen concentration of between approximately 30 and approximately 600 p. p. m., and a water to wool ratio not substantially less than 85 parts by weight of water to 15 parts by weight of wool, retaining said wool in said liquor for between approximately 24 hours and approximately 72 hours to effect digestion of the wool grease, then separating the wool fibers from said liquor.

9. The process of removing from raw, shorn wool naturally adherent wool grease, consisting essentially of lanolin and suint, which comprises introducing said raw wool with said wool grease adhering thereto into an aqueous liquor containing active, methane-producing organisms obtained from sewage sludge digester liquor, excluding air from said liquor, maintaining said liquor and wool at a temperature of between approximately 32° F. and approximately 155° F., a volatile acids concentration of not substantially more than 2000 p. p. m., an ammonia nitrogen concentration of between approximately 30 and approximately 600 p. p. m., and a water to wool ratio of not substantially less than 85 parts by weight of water to 15 parts by weight of wool, retaining said wool in said liquor for between approximately 24 hours and approximately 72 hours to effect digestion of the wool grease, and then separating of the wool fibers from said liquor.

10. The process of removing from raw, shorn wool naturally adherent wool grease, consisting essentially of lanolin and suint, which comprises feeding raw sewage to an active anaerobic digestion zone, anaerobically digesting said sewage in said zone, withdrawing actively digesting material from said digestion zone, seeding water with said withdrawn material to form an active aqueous liquor, introducing said raw wool with the wool grease adhering thereto into said aqueous liquor, excluding air from said liquor, maintaining said liquor and wool at a temperature of between approximately 32° F. and approximately 155° F., a volatile acids concentration of not substantially more than 2000 p. p. m., an ammonia nitrogen concentration of between approximately 30 and approximately 600 p. p. m., and a water to wool ratio not substantially less than 85 parts by weight of water to 15 parts by weight of wool, retaining said wool in said liquor for between approximately 24 hours and approximately 72 hours to effect digestion of the wool grease, and then separating the wool fibers from said liquor.

11. The process of removing from raw, shorn wool naturally adherent wool grease, consisting essentially of lanolin and suint, which comprises feeding raw sewage to an active anaerobic digestion zone, anaerobically digesting said sewage in said zone, withdrawing actively digesting liquor from said digestion zone, introducing said raw wool with said wool grease adhering thereto into said withdrawn liquor, excluding air from said liquor, maintaining said liquor and wool at a temperature of between approximately 32° F. and approximately 155° F., a volatile acids concentration of not substantially more than 2000 p. p. m., an ammonia nitrogen concentration of between approximately 30 and approximately 600 p. p. m., and a water to wool ratio not substantially less than 85 parts by weight of water to 15 parts by weight of wool, retaining said wool in said liquor for between approximately 24 hours and approximately 72 hours to effect digestion of the wool grease, then separating the wool fibers from said liquor.

12. The process of removing from raw, shorn wool naturally adherent wool grease, consisting essentially of lanolin and suint, which comprises feeding raw sewage to an active anaerobic digestion zone, anaerobically digesting said sewage in said zone, withdrawing partially digested sludge from said digestion zone, seeding water with said withdrawn sludge to form an active aqueous liquor, introducing said raw wool with the wool grease adhering thereto into said aqueous liquor, excluding air from said liquor, maintaining said liquor and wool at a temperature of between approximately 32° F. and approximately 155° F., a volatile acids concentration of not substantially more than 2000 p. p. m., an ammonia nitrogen concentration of between approximately 30 and approximately 600 p. p. m., and a water to wool ratio of not substantially less than 85 parts by weight of water to 15 parts by weight of wool, retaining said wool in said liquor for between approximately 24 hours and approximately 72 hours to effect digestion of the wool grease, then separating of the wool fibers from said liquor.

References Cited in the file of this patent

UNITED STATES PATENTS

| | | |
|---|---|---|
| 607,549 | Popp et al. | July 19, 1898 |
| 1,990,523 | Buswell et al. | Feb. 12, 1935 |
| 2,029,702 | Buswell et al. | Feb. 4, 1936 |
| 2,212,750 | Pfannmuller | Aug. 27, 1940 |
| 2,373,410 | Pfannmuller | Apr. 10, 1945 |
| 2,480,761 | Mulqueen | Aug. 30, 1949 |

FOREIGN PATENTS

| | | |
|---|---|---|
| 24,982 | Great Britain | of 1910 |
| 265,972 | Great Britain | of 1927 |

OTHER REFERENCES

Underkoffler et al.: "Industrial Fermentation," vol. 2, Chemical Publ Co., 1954, pages 519–524 and 531–535.